Sept. 11, 1945.  C. H. TAUSER  2,384,708
SELF-CONTAINED DIE SET
Filed Aug. 28, 1944  5 Sheets-Sheet 1

Sept. 11, 1945.  C. H. TAUSER  2,384,708
SELF-CONTAINED DIE SET
Filed Aug. 28, 1944  5 Sheets-Sheet 2

Sept. 11, 1945.  C. H. TAUSER  2,384,708
SELF-CONTAINED DIE SET
Filed Aug. 28, 1944  5 Sheets-Sheet 3

Sept. 11, 1945.     C. H. TAUSER     2,384,708
SELF-CONTAINED DIE SET
Filed Aug. 28, 1944     5 Sheets-Sheet 5

INVENTOR:
Charles H. Tauser,
by Can Har. Gravely.
HIS ATTORNEYS.

Patented Sept. 11, 1945

2,384,708

UNITED STATES PATENT OFFICE 2,384,708

SELF-CONTAINED DIE SET

Charles H. Tauser, Venita Park, Mo., assignor to McDonnell Aircraft Corporation, St. Louis, Mo., a corporation of Maryland Application August 28, 1944, Serial No. 551,553

24 Claims. (Cl. 164—13)

This invention relates to die sets, particularly self-contained, unit-handled die sets of the kind shown in my Patent No. 2,338,982 granted January 11, 1944. The principal objects of the invention are to provide means for automatically removing the stampings and/or punchings from the die set after each complete operation thereof, to provide for the application to and removal from the die press of said means with said die set as a complete preassembled unit; to initiate and control the cycle of operations of said means by the movement of said die set in said die press. Other objects are to provide, as part of said unit-handled die set, a continuously operating unidirectional motor, a normally disengaged clutch for operatively connecting the stamping and punching removing means to said motor for actuation thereby, mechanism directly controlled by said die set for engaging said clutch after each complete operation of the die elements, and mechanism for automatically disengaging said clutch after each complete operation of said stamping and punching removing means. Other objects are to provide a stamping and punching removing mechanism including a carriage movable on said die set, a wiper movable with said carriage, and an endless unidirectional sprocket chain having a connection with said carriage, whereby a reciprocating movement is imparted to said carriage and the wiper member sustained thereby by a one-direction movement of said sprocket chain. Other objects are to provide for simplicity and cheapness of construction and compactness of design, and to attain other advantages hereinafter appearing.

The invention consists in the self-contained die set and stamping and punching removing unit and in the construction, combinations and arrangements of parts hereinafter described and claimed.

In the accompanying drawings, which form part of this specification and wherein like symbols refer to like parts wherever they occur, Fig. 24 is a perspective view of the control arm for the break-joint, Fig. 25 is a perspective view of the extensible break-joint link, showing the elements thereof disassembled; and Fig. 26 is a perspective view of the supporting yoke for the clutch shipper fork.

Figure 1:
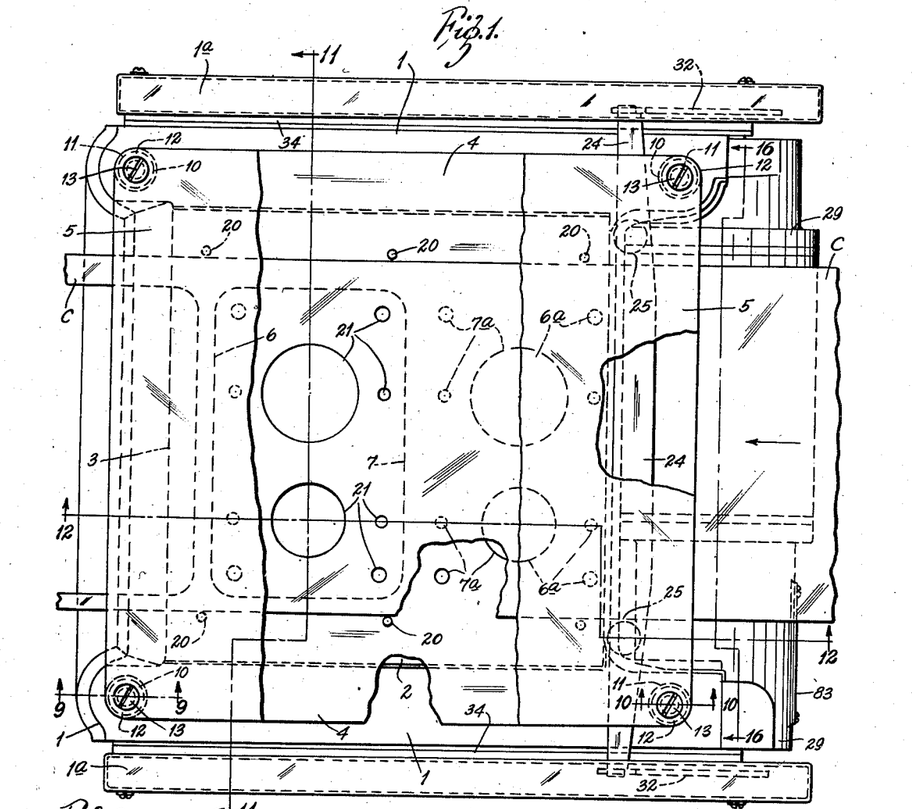
Fig. 1 is a top plan view of a self-contained die set embodying my invention, parts of the punch plate, work and die plate being shown broken away.
Figure 2:
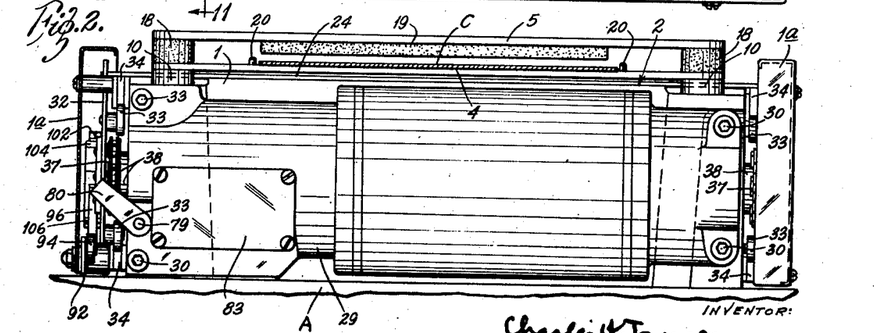
Fig. 2 is a front end elevational view of the die set, with the guard or shield at one side thereof shown in vertical section.
Figure 3:
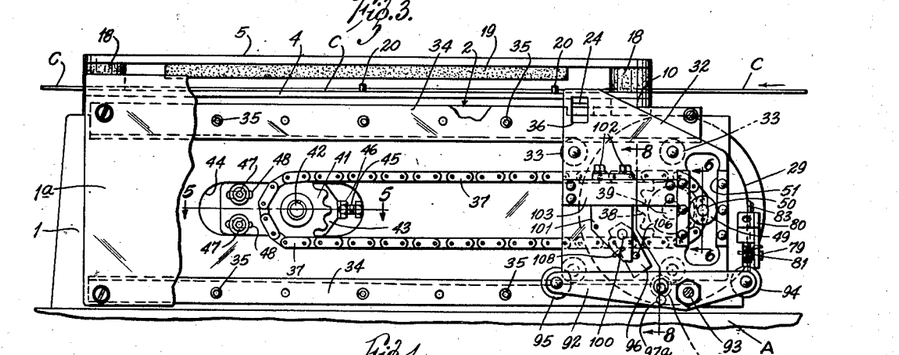
Fig. 3 is a side elevational view of the die set, with the guard on that side shown broken away.
Figure 4:
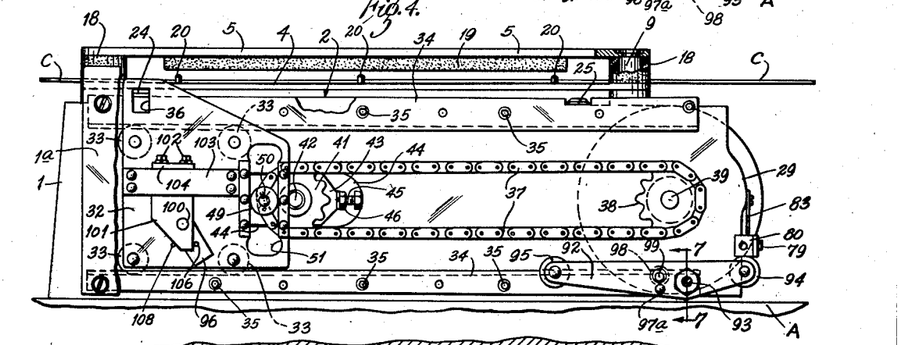
Fig. 4 is a view similar to Fig. 3, showing the mechanism at the end of its wiping stroke.
Figures 5, 6, 7, 21:
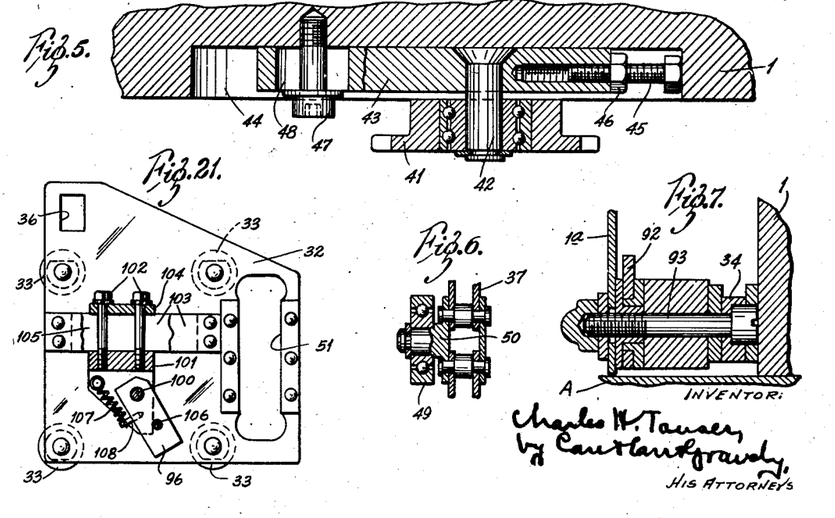
Fig. 5 is an enlarged fragmentary horizontal section on the line 5—5 in Fig. 3.
Fig. 6 is an enlarged fragmentary vertical section on the line 6—6 in Fig. 3.
Fig. 7 is an enlarged fragmentary vertical section on the line 7—7 in Fig. 4.
Fig. 21 is a side elevational view of the carriage which supports the member for operating the rocker lever for breaking the break-joint of the clutch mechanism, the supporting block for said member being shown in vertical section.
Figure 8:
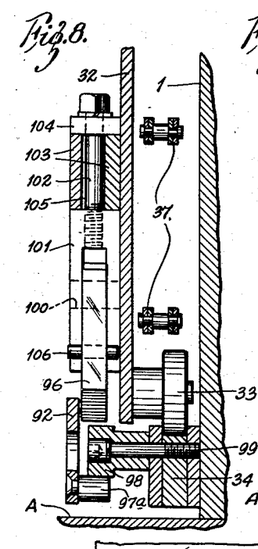
Fig. 8 is an enlarged vertical fragmentary section on the line 8—8 in Fig. 3.
Figure 9:
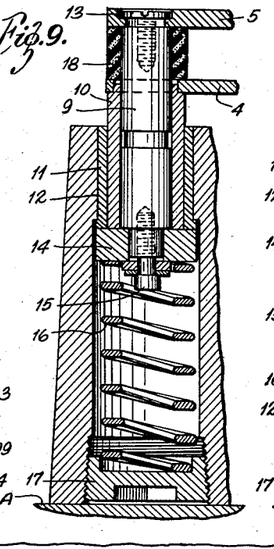
Fig. 9 is an enlarged fragmentary vertical section on the line 9—9 in Fig. 1.
Figure 10:
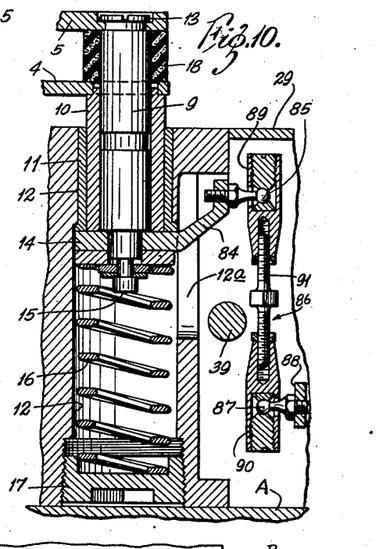
Fig. 10 is an enlarged fragmentary vertical section on the line 10—10 in Fig. 1.
Figures 11, 22, 23:
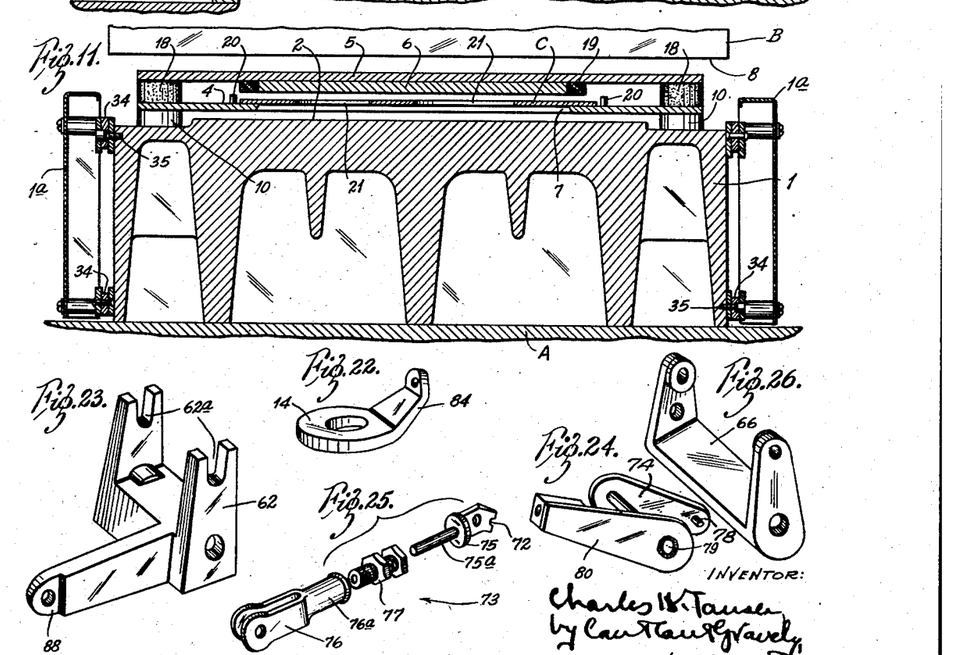
Fig. 11 is a vertical cross-sectional view on the line 11—11 in Fig. 1.
Fig. 22 is a perspective view of the clutch operating washer shown in Fig. 10.
Fig. 23 is a perspective view of the clutch shipper fork.
Figure 12:
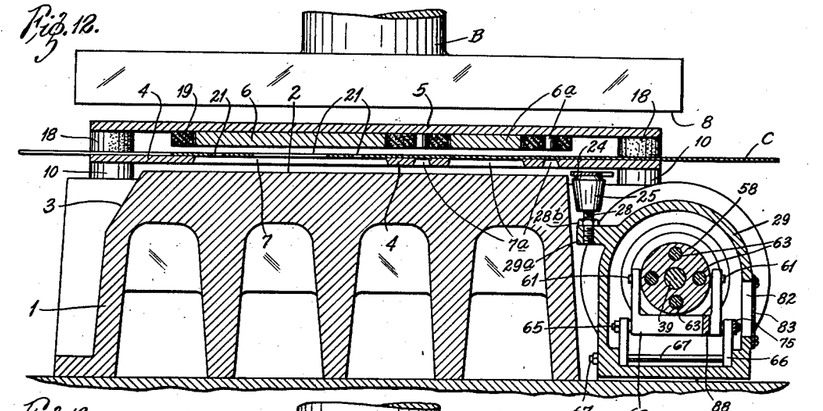
Fig. 12 is a vertical longitudinal sectional view on the line 12—12 in Fig. 1.
Figure 13:
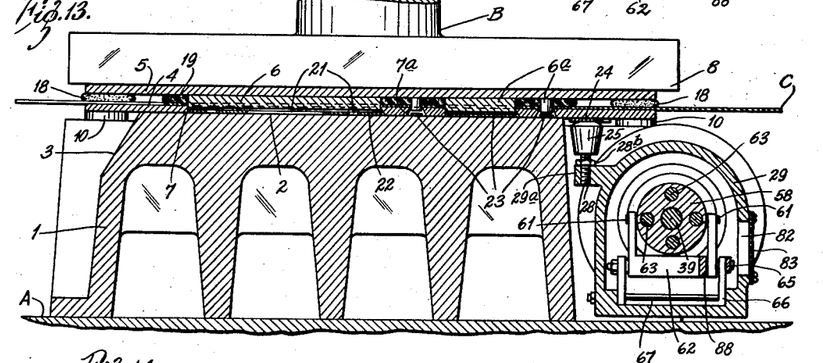
Fig. 13 is a view similar to Fig. 12, showing the punch and die members in lowermost, operative position.
Figures 14, 15:
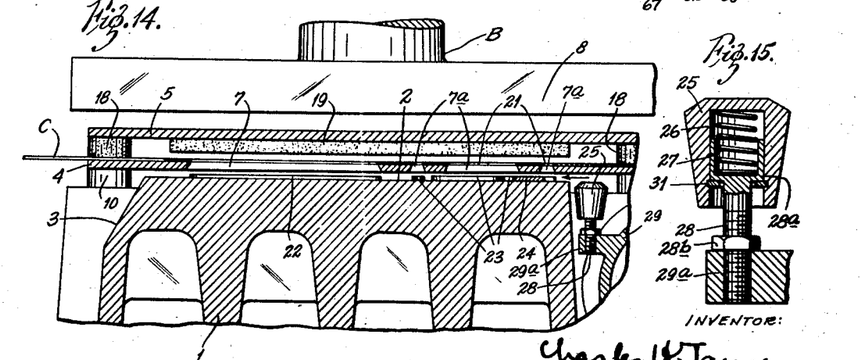
Fig. 14 is a view similar to Fig. 12, showing the wiper blade during its movement across the die body to strip the stampings and slugs or punchings therefrom.
Fig. 15 is an enlarged vertical fragmentary central section through one of the rest blocks for the wiper blade.
Figure 16:
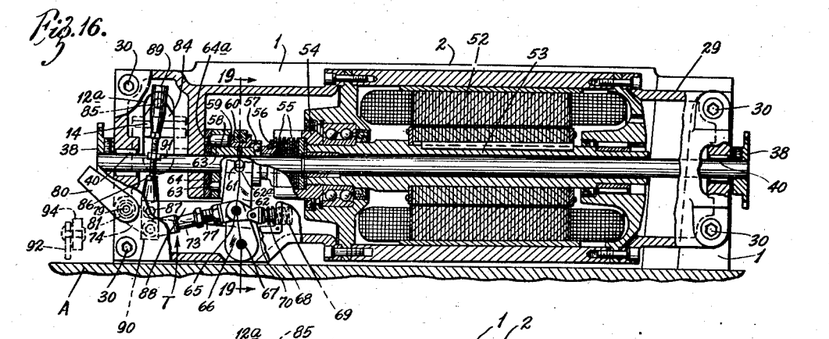
Fig. 16 is a vertical transverse section on the line 16—16 in Fig. 1, showing the positions of the clutch operating parts in the parking position of the wiper mechanism.
Figure 17:
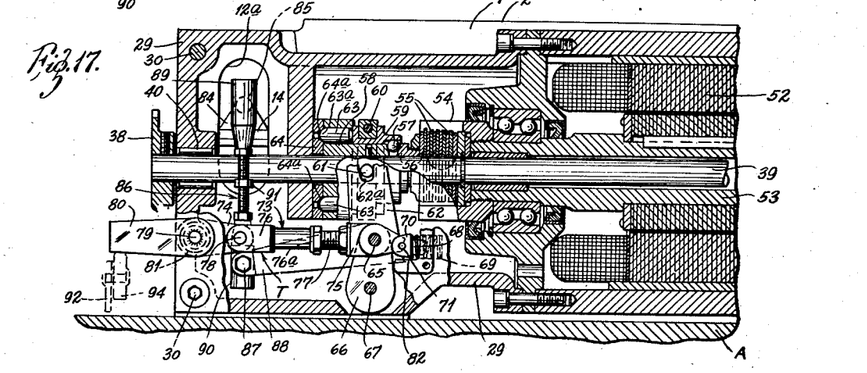
Fig. 17 is an enlarged fragmentary cross-section similar to Fig. 16, showing the position of the clutch operating parts at the end of the downward movement of the punch and die plates.
Figures 18, 20:
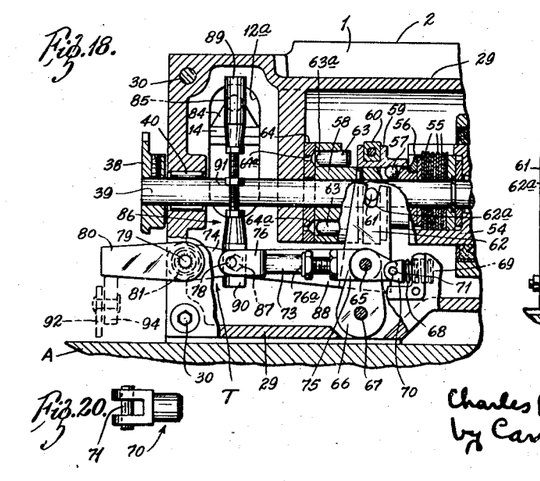
Fig. 18 is a view similar to Fig. 17, showing the position of the clutch operating parts at the end of the upward travel of the punch and die plates.
Fig. 20 is a plan view of the spring-pressed clutch disengaging member.
Figure 19:
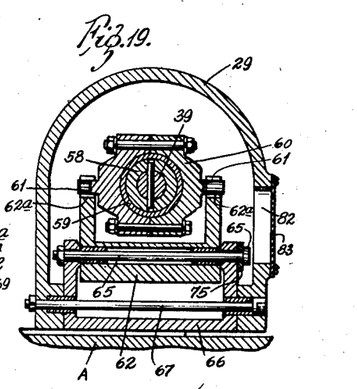
Fig. 19 is an enlarged vertical section on the line 19—19 in Fig. 16.

In the accompanying drawings, my invention is shown embodied in a self-contained, unit-handled die set of the type shown in my Patent No. 2,338,982 of January 11, 1944. In the present drawings, the die set is shown mounted on the bolster A of a conventional die press immediately below the vertically reciprocatory ram or slide member B thereof. Said unit comprises a substantially rectangular body 1 that seats on the bolster A of the die press and has a flat top face 2 and a sharply inclined or beveled end face 3.

Located above the body or bed 1 of the die set is a horizontally disposed rectangular die plate 4; and located above said die plate is a horizontally disposed rectangular punch plate 5 that is provided on its underside with a suitably shaped blanking punch member 6 adapted for cooperation with a similarly shaped blanking die opening 7 provided therefor in said die plate. If desired, the punch plate may be provided on its underside with one or more piercing or perforating punches 6a adapted for cooperation with similarly shaped die openings 7a provided therefor in said die plate. The punch plate 5 is located below the press ram B in position to be engaged by the enlarged lower plate portion 8 thereof when said ram moves downwardly in the press.

The die plate 4 and punch plate 5 are supported for vertical movement relative to one another and to the body 1 of the die set unit under the downward pressure of the press ram by means of upright cylindrical guide posts or leader pins 9 located at the four corners of said body. Each of the guide posts or leader pins 9 is slidably supported in a sleeve 10, which is slidably supported in a bushing 11 fixed in a vertical bore 12 provided therefor in the corner of the body 1. The punch plate 5 is secured by means of a countersunk screw 13 to the top of the post 9; and the die plate 4 seats on the upper end of the slidable post supporting sleeve 10. Each of the posts 9 has a stop member or washer 14 rigidly secured at the lower end thereof by means of a screw 15. The slide sleeve 10 seats on the stop washer 14 fixed to the lower end of the post 9; and said washer abuts against the lower end of the bushing 11 and thus limits the upward travel of said sleeve and post relative to said bushing. Each post 9 and the sleeve 11 associated therewith is yieldably supported in the vertical bore 12 therefor in the body 1 by means of a coil compression spring 16 located in said bore between the stop washer 14 fixed to the lower end of said post and a threaded closure plug 17 for the lower end of said bore.

A rubber spacing sleeve 18 fits around each post 9 between the die plate 4 and the punch plate 5 and serves normally to space them apart. When the punch plate 5 is engaged by the descending ram B of the punch press, the punch plate, die plate 4, posts 9 and sleeves 10 move downwardly together against the pressure of the springs 16 until the die plate seats solidly on the flat top surface 2 of the body 1, after which the punch plate continues to move downwardly with the posts against such spring pressure to engage the punch elements of the punch plate with the die openings in the seated die plate. During the final downward travel of the punch plate 5, the posts 9 move downwardly in the sleeves 10 and the rubber sleeves 18 mounted on said posts are compressed vertically between said punch plate and the seated die plate 4. When the press ram B ascends after the punching operation, the punch and die plates are separated by the vertical expansion of the rubber sleeves 18 and are raised by the springs 16. Non-sticking rubber stripper strips 19 fixed to the underside of the punch plate around the punch elements 6 and 6a serve to prevent the stock C from lifting with said elements upon the upstroke thereof, following the punching operation.

The stock C, which is shown in the form of a sheet metal strip or plate, is manually slid between the punch and die plates from the front end of the die body; that is, from the end of said body opposite the tapered or downwardly inclined end 3 thereof. The metal strip C is preferably fed by hand between the punch and die plates; and the die plate 4 is provided on opposite sides with a series of upstanding pins 20 between which said strip is guided during the manual feeding thereof. When the press ram B descends, the plate 8 at the lower end thereof strikes the punch plate 5, thus forcing said punch plate, together with the strip C to be blanked and punched and the die plate 4, downwardly until the die plate seats on the flat top surface 2 of the body, after which the punch plate moves downwardly relative to the die plate to form perforations 21 in the strip and to punch a stamping or blank 22 from the portion of the strip in which such perforations were made by the preceding punching operation of the die set. When the punch and die plate ascend with the press ram B, the die plate 4 lifts off the flat top face 2 of the body 1, carrying with it the punched strip C, while the punch plate 5 is moved upwardly away from the die plate by the expansive action of the rubber sleeves 18, the perforated blank or stamping 22, together with the punchings or slugs 23 from the perforations being left below said die plate and lying on said flat top face of said body.

The above die set unit is provided with means responsive to the movement of the die set for automatically removing the stamping 22 and punchings 23 from the flat top surface 2 of the body 1 after each complete operation of the die set. As shown in the drawings, said means preferably comprises a horizontally disposed reciprocating wiper blade or pusher bar 24 that extends crosswise of the die set beneath the die plate 4 and is normally disposed just forward of the front end of the flat top face 2 of the body 1 of the die set. After each complete operation of the die elements, the wiper blade 24 moves rearwardly over the flat top surface 2 of the body 1 and pushes the stamping 22 and slugs 23 off the rear end thereof and then reverses its direction of movement and returns to its original position at the front end of said surface. In its forward, parked position, the wiper blade is supported on rest blocks 25, with the lower face of said blade disposed flush with or slightly above the level of the top surface 1 of the body. Each of the rest blocks 25 has a downwardly opening recess 26 therein adapted to receive the upper end of a coil supporting spring 27 therefor whose lower end seats in a recess provided therefor in the upper end of a vertically adjustable upright supporting pin 28 whose lower end is threaded into a lug 29a on a combined motor and clutch housing 29 that is secured by screws 30 to the front end of the body 1 of the die set below the level of the flat top surface 2 thereof. The upper, spring supporting end of the pin 28 is disposed within the downwardly opening recess 26 in the rest block 25; and upward movement of said block relative to said pin is limited by means of a stop washer 31 that is fixed to said block and abuts against an overhanging annular shoulder 28a provided therefor on said pin. The pin 28 is locked in the desired position of vertical adjustment by means of a lock nut 28b.

The wiper blade 24 extends on opposite sides of the body 1 of the die set and has its ends operatively connected to carriage members 32 for movement therewith. Each of the carriages 32 comprises a vertical plate provided with upper and lower pairs of rollers 33 that operate in longitudinally grooved upper and lower guide rails 34 that are secured by screws 35 to the adjacent side face of the body 1 and extend substantially from end to end thereof. The ends of the wiper blade 24 extend into horizontal openings 36 provided therefor in the carriages, said end snugly fitting the sides of said openings which are elongated vertically so as to permit vertical movement of the blade relative to said carriage during the punching operation of the die set.

A joint rearward and return movement is imparted to the two wiper carriages 32 preferably by means of sprocket chains 37 that extend lengthwise of the body 1 between the sides thereof and the carriages. The two sprocket chains 37 are supported at their forward ends on drive sprocket wheels 38 that are fixed to the exposed ends of a horizontal sprocket shaft 39 that extends through the housing 29 and is rotatably supported therein in suitable antifriction bearings 40 located in the ends thereof. The opposite or rear end of each sprocket chain 37 is supported on an idler sprocket wheel 41 journaled on an outstanding horizontal stud 42 fixed to a plate 43 slidably mounted in a recess 44 provided therefor in the adjacent side wall of the body 1. The plate 43 is adjusted longitudinally in the supporting recess 44 to properly tension the sprocket chain 37 by means of an adjusting screw 45, which is threaded into the forward end of the plate with its head in endwise abutting relation to the front end of said recess, the screw being locked in the desired position of the axial adjustment by means of a lock nut 46. The sprocket wheel supporting plate 43 is rigidly locked in the desired position of adjustment by means of screws 47 which pass through horizontally elongated slots 48 in said plate and are threaded into the adjacent side face of the body 1.

Each carriage 32 is connected to the sprocket chain 37 adjacent thereto for movement therewith by means of a roller 49 that is journaled on an outstanding horizontal stud 50 fixed to said chain and works in a vertical elongated slot 51 in said carriage. By this arrangement, the sprocket chains 37, although operating in one direction, impart a reciprocating motion to the carriages 32 and to the wiper blade 24 connected thereto, the carriages moving rearwardly with the rearwardly moving stretches of the chains and then returning to their forward position with the forwardly moving stretches of the chains, the vertically elongated slots 51 permitting the rollers or cams 49 to follow the curved path of travel of the chains at the ends thereof and thus reverse the direction of movement of said carriages and also accelerate and retard the motion of the carriages at the beginning and end of each stroke. As shown in the drawings, the carriages and sprocket driving mechanism therefor are covered by suitable guard casings 1a removably secured to opposite sides of the body 1.

The driving sprocket shaft 39 is rotated by means of a continuously operating unidirectional electric motor 52 which is mounted in the housing 29 lengthwise thereof and has a hollow armature or rotor shaft 53 through which said sprocket shaft extends. The hollow motor shaft 53 terminates at one end in a tubular drive element 54 and is operatively connected to the sprocket shaft 39 to drive the same by means of an axially engaging multiple disk clutch comprising a multiplicity of axially movable disks 55 alternately attached to said drive element and sprocket shaft. The clutch disks 55 are engaged by an axially movable pressure plate 56 that is actuated by a circular series of radially movable balls 57 interposed between the conical ends of said plate and a supporting sleeve 58 which is fixed to the sprocket shaft 39 for rotation therewith. The clutch balls 57 are forced radially inwardly into engagement with the conical ends of the fixed clutch sleeve 58 and the axially movable pressure plate 56 to set the clutch in engaging position preferably by means of a shipper sleeve 59 that is mounted on said clutch sleeve and includes a ring 60 having outstanding trunnions 61 that fit within notches 62a provided therefor in the free ends of the two upstanding arms of a shipper fork 62.

The clutch operating mechanism also includes a circular series of plungers 63 that are supported for longitudinal sliding movement in the clutch sleeve 58 between the shipper sleeve 59 on one end thereof and a hardened steel lock ring 64 which is rigidly fixed to the housing 29 at the other end of said clutch sleeve. The lock ring 64 has a circular series of pockets 64a therein adapted to receive the adjacent rounded ends 63a of the plungers 63. By this arrangement, when the shipper fork 62 is actuated to move the shipper sleeve 59 to clutch disengaging position, the plungers 63 are slid endwise by said sleeve into the pockets in the direction of the fixed lock ring 64 and the rounded ends 63a of said flanges seat in the pockets 64a of said lock ring, thus locking the sprocket shaft 39 against rotation. When the shipper fork 62 is actuated to move the shipper sleeve 59 in the opposite direction, the balls 57 are forced inwardly against the pressure plate 56, thus engaging the friction disks 55 on the sprocket shaft 39 and the driving element 54 of the tubular motor shaft 53, and causing said sprocket shaft to rotate with said motor shaft. During this clutch engaging movement of the shipper sleeve 59, the plungers 63 are released from the pockets 64a in the lock ring 64 before said shipper sleeve moves far enough to engage the clutch and cause the sprocket shaft 39 to rotate.

The shipper fork 62 is mounted for vertical swinging movement lengthwise of the clutch axis on a horizontal pivot 65 mounted in the upper ends of the upstanding arms of a supporting yoke 66 that is pivotally supported for vertical swinging movement lengthwise of the clutch axis on a horizontal pivot shaft 67 mounted in the housing 29 below and parallel with a shipper fork supporting pivot 65. The clutch is normally held in disengaged position by means of an expansion coil spring 68 which is supported in a horizontal pocket 69 provided therefor in the housing 29 opposite the upper end of one arm of the shipper fork supporting yoke 66 and has a fitting 70 at its outer end which carries a horizontal pin 71 that is held by said spring in a semi-circular notch 72 provided therefor in the adjacent end of one of the two links 73 and 74, respectively, of a normally bent break-joint linkage T.

The link 73 of the break-joint is an extensible link comprising end sections 75 and 76 and an intermediate section 77. The end section 75 is pivotally secured to the outermost arm of the yoke member 66 by means of the shipper fork supporting pivot 65 therefor and has the notch 72 therein for the spring-pressed clutch disengaging pin 71. This end section 75 of the link 73 has a cylindrical stem portion 75a which is slidable in the axial bore of the intermediate section 77 which is threaded into a longitudinal bore in the adjacent end of the end section 76, whose opposite end is bifurcated to receive one end of the other link 74. This end of the link 74 is pivotally secured to the bifurcated end of the end section 76 of the link 73 by means of a pivot 78. The other end of the link 74 is fixed to a horizontal shaft 79 journaled in the adjacent side of the housing 29. As shown in the drawings, the shaft 79 has a control arm 80 fixed to the outer end thereof that projects beyond the adjacent end of the combined motor and clutch housing 29 and is adapted to be manually operated to straighten the break-joint T and thus engage the clutch and bring the wiper mechanism into operation without operation of the blanking and punching mechanism.

The break-joint T is held in bent, clutch disengaging position by the pressure of the spring pressed pin 71 against the adjacent end of the link 73; and the intermediate section 77 of said joint is yieldably held in endwise abutting relation to a shoulder formed by the reduced stem portion 75a of the end section 75 of the toggle link 73 by means of a torsional spring 81 which is sleeved on the shaft 79 between the control arm 80 and the housing 29 with one end anchored to said arm and the other anchored to said housing. The housing 29 encloses the motor, the clutch and the clutch operating mechanism therefor and has an opening 82 through its outer side wall through which access may be had to the clutch and clutch operating mechanism, this opening being closed by a removable cover plate 83.

The front corner post 10 located adjacent to the clutch operating mechanism is operatively connected thereto to straighten the break-joint T during the downward travel of the die set and to engage the clutch when the die set reaches the end of its upward movement. This connecting means comprises an outstanding arm 84 on the stop washer 14 for the post located adjacent to the clutch operating mechanism. This arm 84 extends through a vertical slot 12a provided therefor in the wall of the bore 12, the post 9 and the supporting spring 16 therefor. The arm 84 has a ball-and-socket connection 85 with the upper end of an extensible link 86 whose lower end has a similar connection 87 with the outer end of an operating arm 88 that projects from the shipper fork 62 alongside of the link 73 and is disposed in a substantially horizontal position in the bent position of the break-joint T. The extensible link 86 comprises an upper end section 89, a lower end section 90 and an intermediate section 91 having reversely threaded end portions enaging the respective end sections, whereby the link may be lengthened and shortened by rotating the threaded intermediate section relative to said end sections.

Extending lengthwise of the body 1 of the die set near the front end thereof on the side adjacent to the control arm 80 for the break-joint T is a rock lever 92 that is secured by means of a horizontal pivot 93 to said side of said body for vertical swinging movement relative thereto and to said control arm. The front end of the rock lever 92 has a roller 94 journaled thereon that is disposed beneath the free end portion of the control arm 80 for engagement with the underside thereof just before the stationary or forward position of the carriages 32. The rear end of the rocker lever 92 is also provided with a roller 95 adapted, during the return movement of the carriages, to be depressed by a trip member 96 carried by the carriage located above said lever, to thereby swing the forward end of said lever upwardly and thus swing the control arm 80 in the same direction to break the straightened joint T and disengage the clutch. The rock lever 92 is provided rearwardly of its supporting pivot 93 with a horizontal pin 97a adapted to bear against the underside of an eccentric roller 98 mounted on a horizontal pivot 99 secured to the adjacent side of the body. The eccentric roller 98 serves as an adjustable stop which limits the downward swinging movement of the roller 94 at the front end of the rocker lever and thus limit the downwardly swinging movement of the control arm 80 and the upward movement of the joint T to straight line position.

The trip element 96 comprises a plate that is supported on a horizontal pivot 100 for vertical swinging movement in the direction of the carriage travel. The trip supporting pivot 100 is mounted in a supporting block 101 that is clamped by vertical screws 102 to the bottom edges of two horizontal plates 103 rigidly fixed to the outer side face of the carriage. The heads of the screws 102 are supported on a washer plate 104 that seats on the upper edges of the two plates 103; and said last mentioned plates are spaced apart horizontally to provide a vertical slot 105 which extends in the direction of movement of the carriage and through which said screws extend downwardly and are threaded into said trip supporting block. By this arrangement, the trip 96 may be adjusted longitudinally of the carriage to vary the point in the return travel thereof at which the trip engages the roller 95 at the rear end of the rock lever 92 to swing the roller 94 at the front end thereof upwardly against the control arm 80 to break the toggle joint T. The trip 96 is provided with a stop pin 106 which is normally held in engagement with the front end of the supporting block 101 by means of a coil tension spring 107 having one end anchored to said block and the other end secured to a pin 108 carried by said trip. By this arrangement, the trip 96 is adapted to swing upwardly and ride over the rearmost roller 95 on the rock lever 92 during the rearward movement of the carriage and is adapted to abut against said roller to depress the same and raise the front roller 94 during the return movement of the carriage to the front end of the die set.

The hereinbefore described combination die set and wiper mechanism operates as follows:

In the inoperative position of the die set and wiper mechanism, the two carriages 32 are at rest at the front end of the die set, the wiper blade 24 is seated on the rest blocks 25 with its lower surface disposed in the plane of or slightly above the flat top surface 1 of the body and the control arm 80 is raised to break the break-joint T and disengage the clutch. After the work C is inserted between the die plate 4 and the punch plate 5, the punch and die plates move downwardly relative to each other and to the die body 1 in the manner hereinbefore described; whereupon the operating arm 88 of the shipper fork 62 is swung downwardly due to the link connection 86 with the arm 84 of the stop washer 14 fixed to the adjacent downwardly moving post 9. This downward movement of the operating arm 88 of the shipper fork 62 causes said fork to pivot about the trunnions 61 on the ring 60 in the clutch shipper sleeve 58 and the shipper fork supporting yoke 66 to pivot about the supporting pivot shaft 67 provided therefor in the clutch and motor housing 29 without engaging the clutch. This pivotal movement of the shipper fork 62 and its supporting yoke 66 is against the pressure of the spring pressed pin 71 that seats in the notch 72 in the extensible link 73 and serves to bring the bent joint T into straight line position, in which position the pivots 65, 78 and 79 are all substantially in the same horizontal plane, whereby the joint cannot be broken by the pressure of said pin. The straightening of the joint also causes the control arm 80 to swing downwardly into engagement with the front roller 94 of the rock lever 92, thereby preventing crosstravel of said joint to straight line position. Thus, during the downward movement of the punch and die plates, the joint is straightened but no clutch engagement movement is imparted to the shipper fork 62.

After the stamping and punching operations, the post or leader pins 9 are forced upwardly by the springs 16 and the link 86 is pulled upwardly by the stop washer 14 having the arm 84 thereon, thereby swinging the operating arm 88 of the shipper fork 62 upwardly and causing said fork to swing on its pivot 65 in a direction which will engage the clutch when said posts reach the limit of their upward travel. When the clutch is engaged, the sprocket shaft 39 is rotated by the continuously operating motor 52 and the drive sprocket wheels 37 are rotated in a direction which will cause the rollers 49 and the carriages 32 associated therewith to move rearwardly with the upper stretches of the endless sprocket chains 37 along the guide rails 34 to the rear end of the body and then move forwardly with the lower stretches of said chains to the front end of said body. During the rearward movement of the carriages, the wiper blade 24 moves therewith rearwardly across the flat top face 2 of the body to push the blanks 22 and slugs 23 off the downwardly beveled rear end 3. During the return movement of the carriages and the wiper blade to their forward or parking position, the tripper plate 96 carried by one of said carriages engages the rearmost roller 95 on the rocker lever 92 and causes the roller 94 at the forward end of said rocker lever to swing upwardly into engagement with the underside of the control lever 80 and swing the same upwardly. This upward movement of the control lever 80 swings the link 74 downwardly so as to break the break-joint and permit the spring-pressed pin 71 to shift the yoke 66 and the shipper fork 62 supported thereon in a direction that will disengage the clutch.

The hereinbefore described arrangement provides a simple, economical and compact self-contained die set and power driven wiper unit which requires a minimum amount of tool crib storage space and which may be readily mounted in and dismounted from a conventional die press without alteration thereof. The stampings 22 and punchings 23 are quickly removed automatically from the die set after each complete operation thereof; and the cycle of operations of the wiper mechanism is controlled entirely by the movement of the die set. The slot-and-roller connections 49—51 between the sprocket chains and the carriages permit a reciprocating movement to be imparted to said carriages without reversing the drive for said chains; and the movement of the carriage operating rollers 49 around the pitch diameter of the sprocket wheels serves to accelerate and decelerate the carriage travel at the start and end of each stroke. The eccentric adjustment 93 enables the rocker lever 92 to be adjusted to control the straight-line position of the break-joint. The link 86 may be lengthened or shortened to compensate for manufacturing inaccuracies. The extensible link 73 permits over-travel of the link 86 after the break-joint reaches its straight line of position; and the adjustment of the trip plate 96 provides for varying the point in the return movement of the carriage at which the break-joint is bent to release the clutch.

When the clutch is thus disengaged, the plungers 63 carried by the sleeve 58 rigid with the sprocket shaft 39 seats in the pockets 64a provided therefor in the fixed lock ring 64, thereby locking said sprocket shaft against rotation and thus locking the carriages in inoperative position opposite the front end of the flat stamping and slug supporting top face 2 of the body 1. When it is desired to operate the wiper mechanism without operating the die set the control arm 80 is manually depressed until it contacts the roller 94 at the front end of the rocker lever 92, thereby straightening the break-joint T and thus starting the round of operations required to cause the wiper blade 24 to move rearwardly over the top face 2 of the body 1 and then return to its original position at the front end thereof. The spring-supported wiper rest blocks 25 permit the wiper blade to move downwardly with the die plate during the punching and stamping operation and return to its original position when said plate moves upwardly after such operation.

Obviously, the hereinbefore described self-contained die set and wiper assembly admits of considerable modification without departing from the invention. Therefore, I do not wish to be limited to the precise arrangement shown and described.

What I claim is:

1. A die set comprising relatively movable punch and die members, a member reciprocable beneath said members for removing from said die stampings or blanks or punchings produced thereby, and means controlled directly from said punch and die members for actuating said reciprocable member after each complete operation of said die elements.

2. A die set comprising relatively movable punch and die members, a member reciprocable beneath said members substantially at right angles to the direction of movement thereof for removing from said die stampings or blanks or punchings produced thereby, and means controlled by the relative movement of said punch and die members for actuating said reciprocable member after each complete operation of said die elements, all adapted for application to and removal from a die press as a complete self-contained unit.

3. A die set comprising relatively movable punch and die members, means for removing from said die set blanks and/or punchings produced thereby, said means including a member mounted below said punch and die members for sliding movement from one side of said die set to the opposite side thereof and then back to said first mentioned side, and means controlled directly from said punch and die members for imparting such sliding movement to said member after each complete operation of said die elements.

4. A die set comprising relatively movable punch and die members, means for removing from said die set blanks or punchings produced thereby, said means including a member mounted below said punch and die members for movement from a position at one side of said die set to a position at the other side thereof and then back to said first mentioned position, means controlled by the relative movement of said punch and die members for imparting such sliding movement to said member after each complete operation of said die elements, and means for rendering said first mentioned means inoperative upon the return of said member to said first mentioned position.

5. A die set comprising relatively movable punch and die members, means for removing from said die set blanks or punchings produced thereby, said means including a member mounted below said punch and die members for movement from a position at one side of said die set to a position at the other side thereof and then back to said first mentioned position, means controlled by the relative movement of said punch and die members for imparting such sliding movement to said member after each complete operation of said die elements, and means controlled by the movement of said member back to said first mentioned position for rendering said first mentioned means inoperative when said member reaches such position.

6. A die set comprising relatively movable punch and die members, means for removing from said die set blanks or punchings produced thereby, said means including a member having an operating cycle comprising a movement of said member from one side of said die set to the opposite side thereof and a return movement of said member to said first mentioned side after each complete operation of said die elements, means controlled by the relative movement of said punch and die members for starting said cycle of operation, and means controlled by the return movement of said member for terminating said cycle of operations when said member reaches said first mentioned position.

7. A die set comprising a body having a plain top surface, superposed punch and die members mounted above said surface for vertical movement relative thereto and to each other, a wiper member reciprocable over said surface for removing therefrom stampings or punchings produced by said punch and die members, and means controlled by the relative movement of said punch and die members for imparting one complete reciprocation to said reciprocable member after each complete operation of said die elements.

8. A die set comprising relatively movable punch and die members and means controlled directly from said punch and die members for automatically removing from said die set after each operation thereof blanks or punchings produced thereby, said means including a power operated pusher element adapted to move from a parking position at one side of said die set to a position at the opposite side thereof and reverse its direction of movement and return to such parking position.

9. A die set comprising relatively movable punch and die members and means controlled by the relative movement of said punch and die members for automatically removing from said die set after each operation thereof blanks or punchings produced thereby, said means including a power operated pusher element adapted to move from a parking position at one side of said die set to a position at the opposite side thereof and reverse its direction of movement and return to such parking position, and means operable during the return movement of said pusher element for stopping the same in such parking position.

10. A die set comprising relatively movable punch and die members, a member reciprocable beneath said members for removing from said die blanks or punchings produced thereby, a continuously operating motor, a normally disengaged clutch for operatively connecting said member to said motor for actuation thereby, and means controlled by the relative movement of said punch and die members for engaging said clutch after each complete operation of said die elements.

11. A die set comprising relatively movable punch and die members, a member reciprocable beneath said members for removing from said die blanks or punchings produced thereby, a continuously operating motor, a normally disengaged clutch for operatively connecting said member to said motor for actuation thereby, means controlled by the relative movement of said punch and die members for engaging said clutch after each complete operation of said die elements, and means for automatically disengaging said clutch after each complete reciprocation of said member.

12. A die set comprising relatively movable punch and die members, a member reciprocable beneath said members for removing from said die blanks or punchings produced thereby, a continuously operating unidirectional motor, a normally disengaged clutch for operatively connecting said member to said motor for reciprocation thereby, means controlled by the relative movement of said punch and die members for engaging said clutch after each complete operation of said die set, means for normally disengaging said clutch, and means for automatically disengaging said clutch after a complete reciprocation of said member.

13. A die set comprising relatively movable punch and die members, a wiper member reciprocable beneath said punch and die members for removing from said die set blanks or punchings produced thereby, a normally inoperative unidirectional endless sprocket chain operatively connected to said wiper member for reciprocating the same, a continuously operating unidirectional motor, a normally disengaged clutch for operatively connecting said motor to said sprocket to drive the same, means controlled by the relative movement of said punch and die members for engaging said clutch after each complete operation of said die set, and means for automatically disengaging said clutch after each complete reciprocation of said wiper member.

14. A die set comprising a body, vertically movable punch and die members located above said body, a pair of carriages supported for horizontal movement along opposite sides of said body, a wiper member supported by said carriages for movement thereby over said body to remove therefrom blanks or punchings produced by said punch and die members, a pair of endless sprocket chains extending in the direction of carriage movement, connections between said chains and carriages whereby one complete reciprocation is imparted to said carriages and the wiper member sustained thereby for each complete circuit of said sprocket chains, means operated by the movement of said punch and die members for operating said sprocket chains, and means operated by said carriages for stopping said chains after each complete circuit thereof.

15. A die set comprising a body having a flat top face, vertically movable punch and die members located above said body, a pair of carriages supported for horizontal movement along opposite sides of said body, a wiper member supported by said carriages for movement thereby over said body to remove from the flat top face thereof blanks or punchings produced by said punch and die members, a pair of endless sprocket chains extending in the direction of carriage movement, connections between said chains and carriages whereby one complete reciprocation is imparted to said carriages and the wiper member sustained thereby for each complete circuit of said sprocket chains, means operated by the movement of said punch and die members for operating said sprocket chains, and means operated by said carriages for stopping said chains after each complete circuit thereof with said wiper member clear of said flat top surface of said body member.

16. A die set comprising a body, vertically movable punch and die members located above said body, a pair of carriages supported for horizontal movement along opposite sides of said body, a wiper member supported by said carriage for movement thereby over said body to remove therefrom blanks or punchings produced by said punch and die members, a pair of endless sprocket chains extending along said opposite sides of said body in the direction of carriage movement, connections between said chains and the respective carriages comprising a pin on each chain and a vertical slot therefor in said carriage whereby one complete reciprocation is imparted to said carriages and the wiper member sustained thereby with each complete circuit of said chains, means operated by the movement of said punch and die members for operating said sprocket chains after each complete operation of said punch and die members, and means operated by said carriages for stopping said chains after each complete circuit thereof.

17. A die set comprising a body having a flat top surface, vertically movable punch and die members located above said body, a pair of carriages supported for horizontal movement along opposite sides of said body, a wiper member supported by said carriage for movement thereby over said body to remove from the flat top surface of said body blanks or punchings produced by said punch and die members, a pair of endless sprocket chains extending along said opposite sides of said body in the direction of carriage movement, connections between said chains and the respective carriages comprising a pin on each chain and a vertical slot therefor in said carriage whereby one complete reciprocation is imparted to said carriages and the wiper member sustained thereby with each complete circuit of said pins around said chains, means operated by the movement of said punch and die members for operating said sprocket chains after each complete operation of said punch and die members, and means operated by said carriages for stopping said chains after each complete circuit thereof with said wiper member in a parking position beneath said die member but clear of said flat top surface of said body, said wiper member being supported on said carriages for downward yielding movement under the downward movement of said die members.

18. A die set comprising a body, vertically movable punch and die members located above said body, a pair of carriages supported for horizontal movement along opposite sides of said body, a wiper member supported by said carriages for movement thereby over said body to remove therefrom blanks or punchings produced by said punch and die members, a pair of endless sprocket chains extending in the direction of the carriage movement along said sides of said body, connections between said chains and the respective carriages whereby one complete reciprocation is imparted to said carriages and the wiper member sustained thereby for each complete circuit of said sprocket chains, driving sprocket wheels for said sprocket chains, a sprocket shaft for said sprocket wheels, an electric motor, a clutch for coupling said shaft to said motor, means controlled by the movement of said punch and die members for engaging said clutch after each complete operation of said die set, and means operated by one of said carriages for disengaging said clutch after each complete circuit of said chains and each complete reciprocation of said wiper member.

19. A die set comprising a body, vertically movable punch and die members located above said body, a pair of carriages supported for horizontal movement along opposite sides of said body, a wiper member supported by said carriages for movement thereby over said body to remove therefrom blanks or punchings produced by said punch and die members, a pair of endless sprocket chains extending in the direction of the carriage movement along said sides of said body, connections between said chains and the respective carriages whereby one complete reciprocation is imparted to said carriages and the wiper member sustained thereby for each complete circuit of said sprocket chains, driving sprocket wheels for said sprocket chains, a sprocket shaft for said sprocket wheels, an electric motor, a clutch for coupling said shaft to said motor and means for actuating said clutch including a clutch shipper fork operable by the upward movement of said punch and die members to engage said clutch and operable by one of said carriages to disengage said clutch after each complete reciprocation of said wiper member.

20. A die set comprising a body, vertically movable punch and die members located above said body, a pair of carriages supported for horizontal movement along opposite sides of said body, a wiper member supported by said carriages for movement thereby over said body to remove therefrom blanks or punchings produced by said punch and die members, a pair of endless sprocket chains extending in the direction of the carriage movement along said sides of said body, connections between said chains and the respective carriages whereby one complete reciprocation is imparted to said carriages and the wiper member sustained thereby for each complete circuit of said sprocket chains, driving sprocket wheels for said sprocket chains, a sprocket shaft for said sprocket wheels, a continuously operating unidirectional electric motor including a tubular armature shaft through which said sprocket shaft extends, a clutch for coupling said sprocket shaft to said armature shaft and for locking said sprocket shaft against rotation when said clutch is disengaged and for unlocking said sprocket shaft when said clutch is engaged, and means operable by the movement of said punch and die members for engaging said clutch after each complete operation of said die set and operable by one of said carriages for disengaging said clutch after each complete circuit of said chains.

21. A die set comprising a body, vertically movable punch and die members located above said body, a pair of carriages supported for horizontal movement along opposite sides of said body, a wiper member supported by said carriages for movement thereby over said body to remove therefrom blanks or punchings produced by said punch and die members, a pair of endless sprocket chains extending in the direction of the carriage movement along said sides of said body, connections between said chains and the respective carriages whereby one complete reciprocation is imparted to said carriages and the wiper member sustained thereby for each complete circuit of said sprocket chains, driving sprocket wheels for said sprocket chains, a sprocket shaft for said sprocket wheels, a continuously operating electric motor, a clutch for coupling said shaft to said motor, and means operable by the movement of said punch and die members for engaging said clutch after each complete operation of said die set and for disengaging said clutch after each complete circuit of said chains, said means including a clutch shipper fork, a pivotally supported yoke pivotally supporting said fork, a break-joint pivotally anchored at one end to said die set and pivotally connected at the other end to said yoke for operating the same, means carried by one of said carriages for breaking said break-joint to swing said yoke and shipper fork to clutch disengaging position after each complete circuit of said chains, and a member operable by the downward movement of said punch and die members for straightening said break-joint to lock said yoke against pivotal movement and operable by the upward movement of said punch and die members to swing said shipper fork to clutch engaging position.

22. The combination set forth in claim 21, in which the break-joint is yieldable longitudinally to permit overtravel of said last mentioned member during the downward clutch engaging movement thereof, in which the break-joint breaking means carried by the carriage is adjustable relative thereto in the direction of carriage movement, and in which said last mentioned member is adjustable to vary the length thereof.

23. A die set comprising a body, vertically movable punch and die members located above said body, a pair of carriages supported for horizontal movement along opposite sides of said body, a wiper member supported by said carriages for movement thereby over said body to remove therefrom stampings or punchings produced by said punch and die members, a pair of endless sprocket chains extending in the direction of the carriage movement along said sides of said body, connections between said chains and the respective carriages whereby one complete reciprocation is imparted to said carriages and the wiper member sustained thereby for each complete circuit of said sprocket chains, an electric motor, a clutch for coupling said motor to said sprocket chains to drive the same, and means controlled by the relative movement of said punch and die members for engaging said clutch after each complete operation of said die and for disengaging said clutch after each complete circuit of said chains, said means including a break-joint operatively connected at one end to said clutch for operating the same and pivotally anchored to said die set at its other end, a rocker lever mounted on said die set and operable by one of said carriages for breaking said break-joint and releasing said clutch, and a member operable by the movement of said punch and die members for straightening said break-joint and engaging said clutch.

24. A die set comprising a body, vertically movable punch and die members located above said body, a pair of carriages supported for horizontal movement along opposite sides of said body, a wiper member supported by said carriages for movement thereby over said body to remove therefrom stampings or punchings produced by said punch and die members, a pair of endless sprocket chains extending in the direction of the carriage movement along said sides of said body, connections between said chains and the respective carriages whereby one complete reciprocation is imparted to said carriages and the wiper member sustained thereby for each complete circuit of said sprocket chains, an electric motor, a clutch for coupling said motor to said sprocket chains to drive the same, and means controlled by the movement of said punch and die members for engaging said clutch after each complete operation of said die and for disengaging said clutch after each complete circuit of said chains, a break-joint pivotally connected at one end to said yoke for operating the same and pivotally anchored to said die set at its other end, a rocker lever mounted on said die set for breaking said break-joint and releasing said clutch, a trip member mounted on one of said carriages and engageable with said rocker lever to move the same to break-joint breaking position, means for adjusting said trip member in the direction of carriage travel, and a member operable by the downward movement of said punch and die members for straightening said break-joint and engaging said clutch.

CHARLES H. TAUSER.